United States Patent [19]

Sheridon

[11] Patent Number: 5,604,027
[45] Date of Patent: Feb. 18, 1997

[54] SOME USES OF MICROENCAPSULATION FOR ELECTRIC PAPER

[75] Inventor: Nicholas K. Sheridon, Los Altos, Calif.

[73] Assignee: Xerox Corporation, Stamford, Conn.

[21] Appl. No.: 368,120

[22] Filed: Jan. 3, 1995

[51] Int. Cl.[6] .................................................... B32B 3/00
[52] U.S. Cl. .................. 428/323; 428/320.2; 428/402.2; 428/402.21; 264/4; 264/7
[58] Field of Search ............................... 428/320.2, 323, 428/402.2, 402.21; 264/4, 7

Primary Examiner—Patrick Ryan
Assistant Examiner—C. Lee
Attorney, Agent, or Firm—Robert Cunha

[57] ABSTRACT

Bichromal balls have two hemispheres, typically one black and one white, each having different electrical properties. Each ball is enclosed within a spherical shell and then a space between the ball and shell is filled with a liquid to form a microsphere so that the ball is free to rotate in response to an electrical field. The microspheres can then be mixed into a substrate which can be formed into sheets or can be applied to any kind of surface. The result is a film which can form an image from an applied electrical field.

9 Claims, 3 Drawing Sheets

SOME USES OF MICROENCAPSULATION FOR ELECTRIC PAPER

BACKGROUND OF THE INVENTION

A "twisting ball" medium for displaying an image comprising internal bichromal balls that rotate to show either black or white hemispheres in response to an externally applied electrical field, and that are contained in individual liquid filled spherical shells that are in turn dispersed in a transparent binder, which is usually solid when used.

U.S. Pat. Nos. 4,126,854 and 4,143,103 describe a twisting ball display and are incorporated by reference herein. These patents describe a display system in which the display panel is comprised of spherical balls which have an optical and an electrical anisotropy due to each hemisphere surface having a different color and electrical charge in contact with a liquid. These spherical particles are imbedded in a solid substrate and a slight space between each ball and the substrate is filled with a liquid so that the balls are free to rotate, in a changing electrical field, but can not migrate from one location to another. If one hemisphere is black and the other is white, each pixel can be turned on and off by the electrical field applied to that location. Each pixel can be individually addressed, and a full page image can thus be generated.

Most commonly the solid substrate used in this display is a gel, typically a silicone gel. The purpose of using this material lies in the remarkably large expansion in volume exhibited by gels when soaked in certain liquids, which we refer to as plasticizing liquids. 30% expansions are not uncommon when soaked in silicone oils. The bichromal balls do not expand when contacted by the plasticizing oil, so a spherical cavity opens up around each ball when the gel is immersed in a plasticizing liquid. This space fills with the plasticizing liquid.

After being soaked in plasticizer, the gel is soft and lacks durability, and must be bonded between glass or plastic sheets for protection. This process has the disadvantages that a large number of steps are required for the fabrication, adding to the cost, and that the final product lacks some of the optical and tactile properties of paper, which it emulates in some embodiments. It will be seen that significant advantages will further accrue when the limitations to planar geometries are removed. A product that does not require the use of bonding sheets would be desireable.

Historically there have been several approaches to the problem of isolating twisting balls for displays. Lee (L. L. Lee, "Matrix-Addressed Magnetic Particles Display", IEEE Trans. on Elect. Devices, Vol. ED-22, No. 9, September 1975) created a honeycomb type of structure in which the balls were contained in separate compartments which were an integral part of the substrate. Such a structure was inherently expensive to make and effectively limited the ball sizes that could be used. Later, Saitoh et al (M. Saitoh, T. Mori, R. Ishikawa, and H. Tamura, "A Newly Developed Electrical Twisting Ball Display", Proc. of the SID, Vol. 23/4, 1982) developed an isolation technique in which the individual balls were coated with a resin and subsequently dispersed in a poly vinyl alcohol substrate. After the PVA was hardened it was immersed in a solvent that had minimal effect on the PVA but that dissolved the resin around the balls, leaving them free to rotate. Once again, this is an expensive proceedure that would be difficult to implement on large scale. The most successful approach to date was that of Sheridon, described in U.S. Pat. No. 4,143,103 referenced above and described in the last two paragraphs.

SUMMARY OF THE INVENTION

The bichromal balls are individually enclosed in spherical shells with the space between the two spherical surfaces filled with dielectric liquid. The resultant capsules may be dispersed in a second liquid, such as an optically clear epoxy, which may be subsequently hardened. If the hardened liquid, now a solid, is of sufficient strength no further protection is required. The resultant display is then in the form of a thin, paper-like sheet without the bulkiness and optical problems created by the protective cover sheets as in the prior art. Alternatively, the resultant display may be easily conformally coated on a non-planar surface for even greater flexibility of applications.

DETAILED DESCRIPTION OF THE INVENTION

Figure 1:
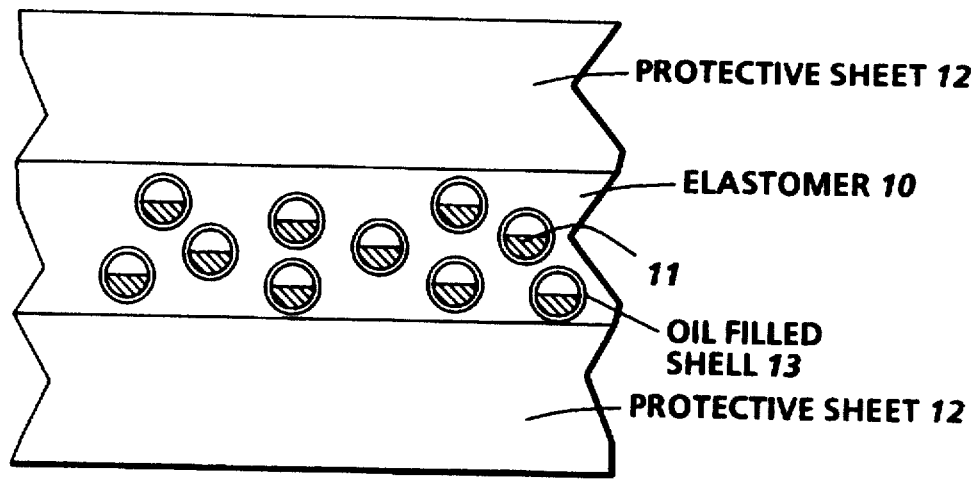
FIG. 1 is a cross section of the prior art version of this twisting ball display.
Figure 2:
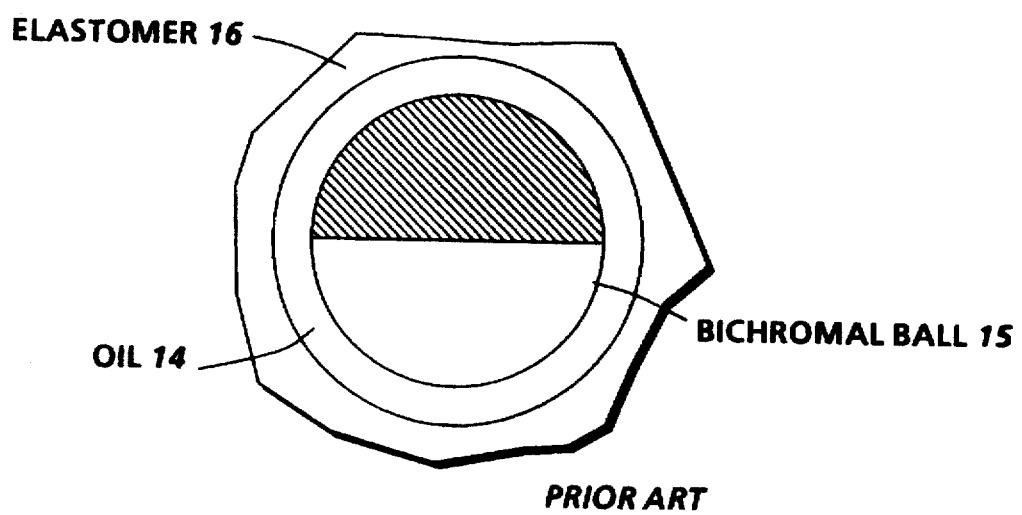
FIG. 2 is an enlarged view of the prior art bichromal ball surrounded by plasticizing oil.

FIG. 1 is a cross section of the prior art version of this twisting ball display. A large number of bichromal balls 11 are mixed into an uncured elastomer which is subsequently spread into a thin layer 10 and cured to form a solid sheet of elastomer. Next this elastomer is soaked in a plasticizing oil which swells the elastomer but generally does not effect the bichromal balls. The result is that a spherical cavity 13 opens up around each bichromal ball, and this cavity subsequently fills with the plasticizing liquid. Finally the plasticized elastomer is bonded between two protective, transparent sheets of plastic or glass, 12, one or both of which might have a transparent condicting coating. FIG. 2 is an enlarged view of the bichromal ball 15 surrounded by plasticizing oil 14 within a cavity in elastomer 16.

The substrate material used in the prior art twisting ball display was largely limited to the class of elastomer materials, because these materials undergo the greatest extent of swelling when plasticized and thus form cavities of adequate size.

This invention is the improvement of using a separate encapsulating shell to enclose both the bichromal ball and a sufficient thickness of dielectric oil 14 to allow free rotation of the bichromal ball. These capsules then constitute voltage sensitive members that may be dispersed in any medium across which an electrical field may be impressed. Most commonly this medium will be a solid, with the balls dispersed in this solid while it is in a liquid phase. It will be subsequently hardened, by chemical reaction, by cooling, etc. The medium may also be a liquid, or a slurry consisting of a liquid and solid particles, or solid particles whose purpose might be to immobilize the capsules. Indeed, any medium might be used to contain the capsules provided that it does not damage the protective shell of the capsule or diffuse undesireable chemicals across the shell. These voltage sensitive members will then indicate the voltage condition at their locations. When used in conjunction with an addressing means they can constitute an information display. Other uses might include the visualization or measurement of local electrical fields in test systems.

This invention allows the substrate material to be made from a very large number of dielectric materials that are obtained by hardening a liquid phase of the material into which the bichromal balls in liquid-filled shells have been dispersed. In general the shells will permit chemical isolation of the hardenable material from the encapsulated liquid, providing great freedom in choosing the substrate material.

Figure 3:
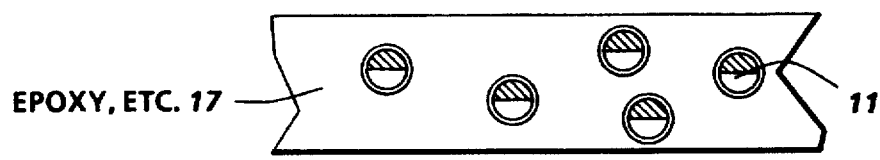
FIG. 3 shows a plurality of capsules dispersed in a substrate.
Figure 4:
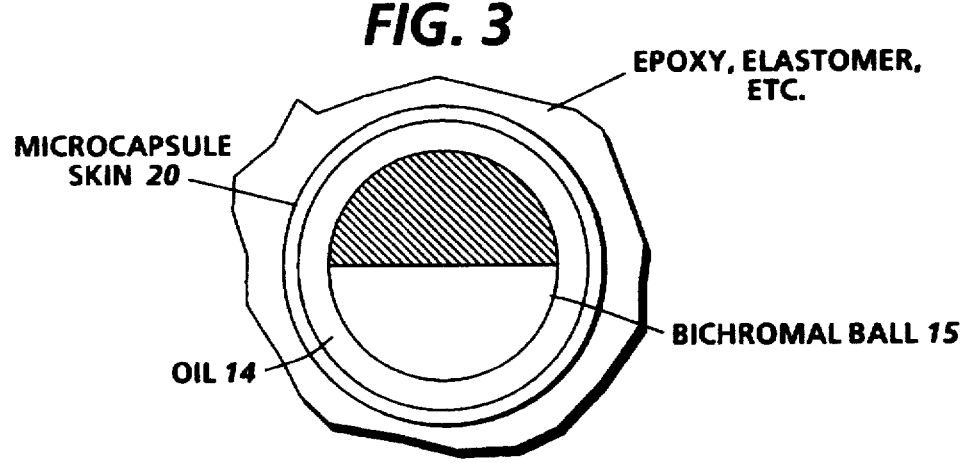
FIG. 4 is a cross section of a capsule of FIG. 3.

The process of enclosing the bichromal balls and the oil layer in individual capsules is a form of microencapsulation. There is a rich scientific and patent literature on microencapsulation. It is generally discussed in "Microcapsule Processing and Technology" by Asaji Kondo, 1979, Marcel Dekker, Inc. Two particular methods that are especially appropriate to this use are discussed here. An individual capsule is illustrated in FIG. 4 and a plurality of such capsules dispersed in a substrate is shown in FIG. 3.

Figure 5:
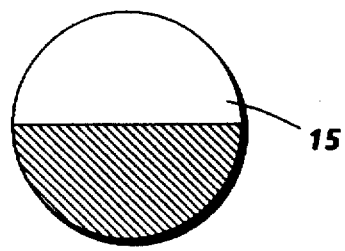
FIG. 5 is a bichromal ball before coating.
Figure 6:
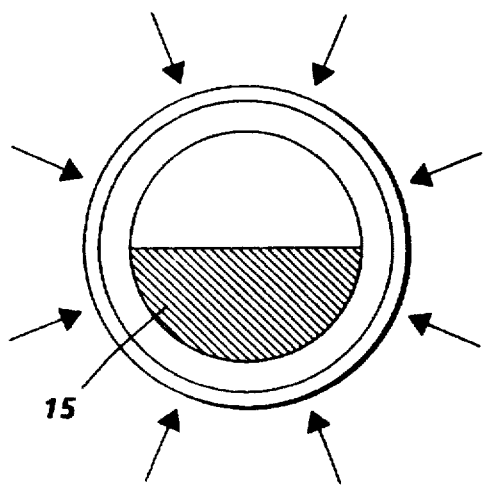
FIG. 6 is a bichromal ball after coating.

A bichromal ball 15 as shown in FIG. 5 is coated uniformly to result in a coated ball as shown in FIG. 6. The coating may be of Parylene (a product of the Union Carbide Corp.) and take place in a vacuum chamber. It may be a polymer which is dissolved in a solvent and precipitated onto the ball by means of a temperature change, a ph change, etc. A process such as this is discussed by Wei-Hsin Hou in "Polymer-Encapsulated particles with Controlled Morphologies:Preparation, Characterization and Application", PhD Thesis, Lehigh University, 1991. UMI Disseration Service, University Microfilms International, Ann Arbor, Mich. It may be a hardenable liquid such as an epoxy and deposited as a mist or in a tumbling situation such as in a fluidized bed. It may be a polymer and deposited by means of an electrostatic painting process.

Figure 7:
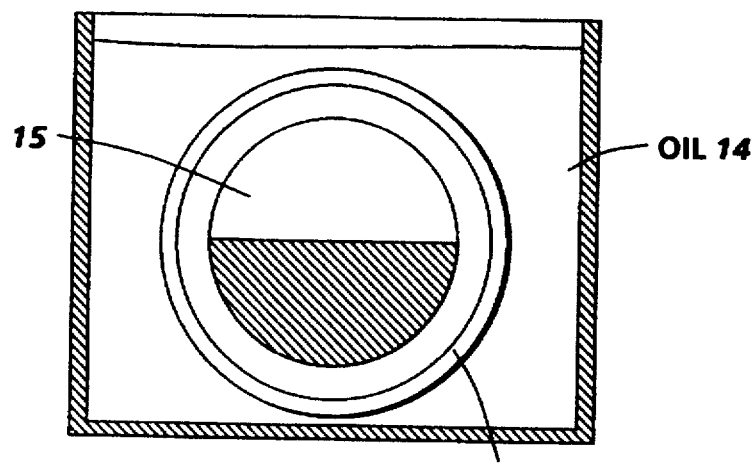
FIG. 7 shows a bichromal ball immersed in dielectric liquid.
Figure 8:
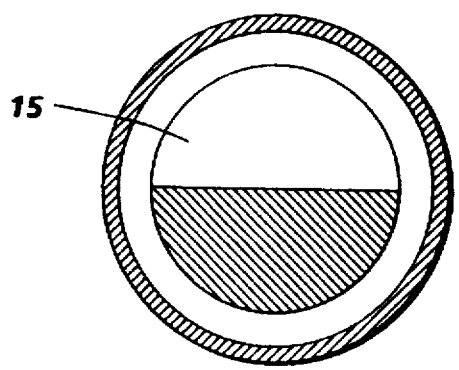
FIG. 8 shows the finished microcapsule.

After the coating is applied, the bichromal balls are immersed in dielectric liquid 14, as shown in FIG. 7, which has a chemical affinity for the coating and plasticizes it, causing it to swell. This process will also drive the liquid into the space between the ball and the shell, at least partially filling it. Subsequently placing the microcapsules thus formed into a second liquid that diffuses more rapidly through the shell than the first liquid will tend to more fully fill the space within the shell. The finished product is shown in FIG. 8, and is ready to be mixed into the hardenable substrate.

Figure 9:
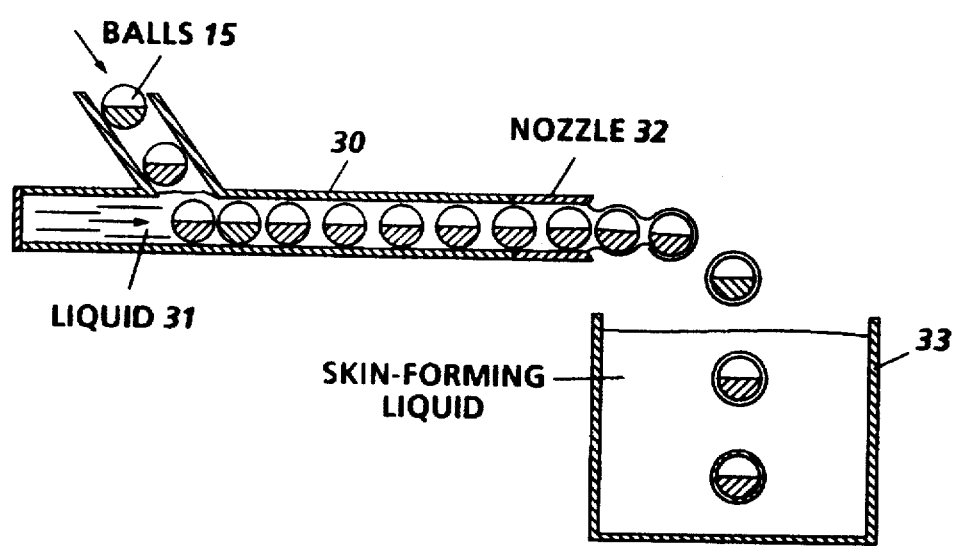
FIG. 9 shows one method of encapsulating bichromal balls.

A second approach, discussed in Kondo's work, relies on the well-known fact that when drops of certain liquids are placed in other liquids, an interface skin will rapidly form between the two liquids. A subset of this is called interfacial polymerization and is used to fabricate certain polymers. One method of using this phenomenon to encapsulate bichromal balls with a dielectric liquid layer is shown in Figure 9. On the left side of the apparatus the balls 15 are mixed with the liquid 31 in the pipe 30. They are ejected from the nozzle 32 under such conditions that each ball is separate and is coated with the dielectric liquid to a predetermined thickness. As these fall into the tank 33, the chemical reaction between the dielectric liquid and the film forming liquid creates a tough film over and fully encapsulates the ball, including the dielectric liquid. These are removed from the tank and dried for use.

The microcapsules formed by these processes need only be strong enough to hold up to the process of being mixed with the hardenable transparent material used to form the sheet of electric paper. Such transparent materials include epoxies and polymers having an end state as solids, gels and elastomers. In other cases, such as where the microcapsules are used to determine electrical fields, stronger structures may be required.

A particularly useful application of this technology is to mix the capsules containing the bichromal balls with a transparent hardenable material, such as a varnish, and to paint the resulting dispersion onto a surface, which may be nonplanar. In this way one may not only obtain display surfaces that conform to objects of any shape, but one also obtains articles of decoration or camoflauge. Simply applying electical fields will cause such surfaces to change color, inexpensively. Useful surfaces include structural members and fabrics, especially articles of clothing. In addition to being dispersed in the volume of a liquid that is subsequently hardened, the microcapsules can also be adhered to adhesives that are coated onto surfaces, typically forming monolayers. Thus, for example, an article of clothing could be coated with an adhesive and subsequently microcapsules could be adhered to the adhesive. Thereafter the color of that article of clothing could be altered by the application of electrical fields. Likewise, the surface of an object that there is an intention to conceal could be coated with a monolayer of microcapsules and a spatially varying voltage could be applied to these microcapsules to control the pattern of color on the surface of that object.

This invention is then highly advantaged over prior art methods of providing isolation cavities for the bichromal balls used in twisting ball displays to rotate. It is an inherently low cost technique that allows a wide choice of substrate materials and that can be applied to a large variety of planar and non-planar surfaces. It will allow the fabrication of very thin sheets of display materials having more paper-like properties than were possible with prior art methods.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A display medium comprising:

a plurality of bichromal balls, each having two hemispheric surfaces, one surface differing from the other in both color and electrical characteristics a layer of liquid surrounding each ball, a skin of a first compound surrounding the layer of liquid to form a microcapsule, and a substrate of a second compound within which all of said microcapsules are encapsulated.

2. The medium of claim 1 wherein said substrate is a solid.

3. The medium of claim 1 wherein said substrate is a liquid.

4. A display medium comprising:

a plurality of bichromal balls, each having two hemispheric surfaces, one surface differing from the other in both color and electrical characteristics a layer of liquid surrounding each ball, a skin of a first compound surrounding the layer of liquid, and a substrate of a second compound within which all of said microcapsules are encapsulated, which substrate is adapted to be bonded to a surface.

5. The medium of claim 4 wherein said adhesive layer is hardenable.

6. The medium of claim 4 wherein said adhesive layer is a liquid.

7. The surface of claim 4 wherein said surface is flat.

8. The surface of claim 4 wherein said surface is not flat.

9. The surface of claim 4 wherein said surface is a fabric.

* * * * *